United States Patent [19]
Lippman et al.

[11] Patent Number: 4,987,480
[45] Date of Patent: Jan. 22, 1991

[54] MULTISCALE CODING OF IMAGES

[75] Inventors: Andrew B. Lippman, Salem, Mass.; William J. Butera, Arlington, Va.

[73] Assignee: Massachusetts Institute of Technology, Cambridge, Mass.

[21] Appl. No.: 378,071

[22] Filed: Jul. 11, 1989

[51] Int. Cl.$^5$ ............................................. H04N 11/04
[52] U.S. Cl. ...................................... 358/13; 358/133
[58] Field of Search ........................... 358/133, 13, 12

[56] References Cited

U.S. PATENT DOCUMENTS

| | | | |
|---|---|---|---|
| 4,383,272 | 5/1983 | Netravali et al. | 358/136 |
| 4,743,959 | 5/1988 | Frederiksen | 358/12 |
| 4,857,993 | 8/1989 | Music | 358/13 |
| 4,908,698 | 3/1990 | Enomoto | 358/13 |

OTHER PUBLICATIONS

Nasrabadi et al., "Image Coding Using Vector Quantization: A Review," vol. 36, No. 8, *IEEE Transactions on Communications*, pp. 957–971 (1988).

Karlsson et al., "Subband Coding of Video for Packet Networks," Optical Engineering, Jul. 1988, pp. 574–586.

Westerink et al., "Subband Coding of Images Using Vector Quantization", vol. 36, No. 6, *IEEE Transactions on Communications*, pp. 713–719 (1988).

Gharavi et al., "Application of Quadrature Mirror Filtering to the Coding of Monochrome and Color Images", *IEEE*, pp. 2384–2386 (1987).

Tran et al., "An Efficient Pyramid Imaging Coding System," 1987, *IEEE*, pp. 744–747.

Ramamurthi et al., "Classified Vector Quantization of Images," vol. 34, No. 11, *IEEE Transactions on Communications*, pp. 1105–1115 (1986).

Gray, "Vector Quantizers", *IEEE ASSP Magazine*, pp. 4–29 (1984).

Adelson et al., "Pyramid Methods in Image Processing," 1984, 29–6 *RCA Engineer*, pp. 33–40.

Glenn et al., "Reduced Bandwidth Requirements for Compatible High Definition Television Transmission," *Proceedings of the 38th Annual Broadcast Engineering Conference*, National Association of Broadcasters, pp. 297–305, 1984.

Gersho, "On the Structure of Vector Quantizers," vol. 28, No. 2, *IEEE Transaction on Information Theory*, pp. 157–166 (1982).

Heckbert, "Color Image Quantization for Frame Buffer Display," vol. 16, No. 3, *Computer Graphics*, pp. 297–305.

Primary Examiner—Howard W. Britton
Attorney, Agent, or Firm—Thomas J. Engellenner; David A. Jacobs

[57] ABSTRACT

Image encoding apparatus and methods include recursively decomposing the luminance values of sequential frames into spatio-temporal spectral components, by quadrature mirror filter (QMF) processing of the luminance values. The filtered signals are subsampled, and each decomposed level of the spectral components is coded by vector quantization.

20 Claims, 8 Drawing Sheets

MULTISCALE CODING OF IMAGES

BACKGROUND OF THE INVENTION

This invention relates generally to systems for image coding, and, more particularly, relates to apparatus and methods for coding images for transmission and retrieval over a limited bandwidth communications channel, to attain maximum data compaction with minimum perceptible error.

In recent years, the video information and entertainment market has rapidly expanded and diversified, with the advent of commercial innovations such as pay-per-view services, videotext, and alternative video communication channels, such as telephone lines. Certain developments in this field, however, have been hindered by the limited bandwidth available in the allocated channel and frequency spectrum.

A number of techniques and systems for coding of images have been proposed or developed, with the object of compressing image information for limited bandwidth transmission, storage or retrieval. Conventional coding systems attempt to limit the data rate and communications channel bandwidth required for image transmission or retrieval by decomposing images into subbands. Subband coding is discussed in Karlsson et al, "Subband Coding of Video for Packet Networks," *Optical Engineering*, Jul. 1988, pp. 574-586, which sets forth a method for dividing a three-dimensional signal into subsampled frequency bands in temporal, horizontal and vertical dimensions, with further spatial analysis of the subband obtained through low pass first stage filtering.

A number of such systems utilize quadrature mirror filters (QMFs) to divide a given image into subbands. See, for example, Gharavi et al, "Application of Quadrature Mirror Filtering to the Coding of Monochrome and Color Images", *IEEE*. pp. 2384-2386 (1987).

Moreover, certain image processing techniques provide for coding of the various subbands with different levels of precision, in recognition of the non-uniform sensitivity of the human visual system (HVS) to different spatio-temporal components of a given image. The non-uniform response of the HVS is discussed in Glenn et al, "Reduced Bandwidth Requirements for Compatible High Definition Television Transmission," *Proceedings of the* 38th Annual Broadcast Engineering Conference, National Association of Broadcasters, pp. 297-305, 1984, herein incorporated by reference, which discloses techniques for transmitting low resolution data at high rates and "detail data" at low rates.

Other coding processes utilize vector quantization of images. Quantization is the assignment of representation values to ranges of input values. A vector quantizer, in particular, maps a set of continuous or discrete vectors into a sequence of codes suitable for communication or storage, to achieve data compression. The sequence of codes forms a "codebook" which can be stored in memory. Vector quantizing systems for image processing are discussed in the following publications, herein incorporated by reference:

Gray, "Vector Quantizers", *IEEE ASSP Magazine*, pp. 4-29 (1984);

Gersho, "On the Structure of Vector Quantizers", Vol. 28, No. 2 *IEEE Transaction on Information Theory*, pp. 157-166 (1982);

Ramamurthi et al, "Classified Vector Quantization of Images," Vol. 34, No. 11, *IEEE Transactions on Communications*, pp. 1105-1115 (1986);

Nasrabadi et al, "Image Coding Using Vector Quantization: A Review," Vol. 36, No. 8, *IEEE Transactions on Communications*, pp. 957-971 (1988); and Westerink et al, "Subband Coding of Images Using Vector Quantization", Vol. 36, No. 6, *IEEE Transactions on Communications*, pp. 713-719 (1988).

The Westerink publication presents a two-dimensional vector quantization subband coding technique in which frequency band decomposition of an image is executed by two-dimensional separable QMFs, which split the image spectrum into 16 equal-rate subbands.

Certain coding systems also employ pyramidal image representations, in an effort to provide data compression. In a pyramid image structure, a full-size image is successively filtered and decomposed to form a reduced representation. Pyramid coding systems are presented in Tran et al, "An Efficient Pyramid Imaging Coding System," 1987, IEEE, pp. 744-747, which proposes a pyramid image coding system, using quadrature mirror filters, to form image pyramids for hierarchical image transmission and retrieval. Image pyramids are also discussed in Adelson et al, "Pyramid Methods in Image Processing," 1984, 29-6 *RCA Engineer* pp. 33-40.

Conventional coding systems, however, continue to require excessive bandwidth and often produce perceptible error in transmission and reconstruction of images.

It is accordingly an object of the invention to provide methods and apparatus for encoding and decoding images for seleCtive storage, or for transmission and retrieval over a bandwidth limited channel, with maximum data compaction and minimum perceptible error.

Conventional coding systems also require complex decoding methods and expensive decoding apparatus, which significantly limit the commercial practicability of such systems.

It is therefore a further object of the invention to provide image coding and decoding methods and apparatus which permit optimal, inexpensive implementation of the decoding process, to enable wide commercial distribution and utilization of such decoders.

Other general and specific objects of the invention will in part be obvious and will in part appear hereinafter.

SUMMARY OF THE INVENTION

The foregoing objects are attained by the invention, which provides methods and apparatus for coding and decoding of image information. One aspect of the invention includes decomposition elements for decomposing image frame signals into separate luminance and chrominance signals. The chrominance signals are bandlimited and subsampled in two spatial and one temporal dimension, while the luminance signals are decomposed into luminance subbands. Respective luminance subbands are coded by a vector quantizer to generate codes and codebooks which can be transmitted with the processed chrominance signals over a limited bandwidth communications channel.

Methods and apparatus are disclosed for reducing the size and bandwidth requirements for transmission of codes and codebooks, including orientation-independent codebook generation, indirect addressing of codebooks and lookahead coding It is possible to categorize image sequence coding systems according to the amount of information they must have at their disposal before any coding can be begun. For example, intra-frame block coders require only a few lines of picture information and inter-frame coders require a delay of at least one frame.

The coding method herein is termed "Recursive Vector Quantization." It is a sub-band coding system where the image is first recursively divided into a set of sub-bands by a pyramid decomposition, each level of which is then vector quantized. The code generation process recursively constructs code tables for higher levels of the pyramid from codebooks already used in the lower levels and uses a different block size at each level.

The period bracketing scene boundaries—such as an explicit edit or rapid action—is used to transmit table update information. In order to do this, the encoder must "look-ahead" to determine either the scene boundaries or convenient places where bandwidth may be allocated to table update information. Similar lookahead is used in decoding.

This approach has been used to encode moving picture sequences at NTSC television resolution at average data rates of 1.5 megabits per second, or for storage on digital optical discs of similar bandwidth. Since the coding operates on at most two frames at one time, random access to any image within the sequence is simple and direct.

The invention will next be described in connection with certain illustrated embodiments; however, it should be clear to those skilled in the art that various modifications, additions and subtractions can be made without departing from the spirit or scope of the claims.

BRIEF DESCRIPTION OF THE DRAWINGS

For a fuller understanding of the nature and objects of the invention, reference should be made to the following detailed description and the accompanying drawings, in which.

DETAILED DESCRIPTION OF ILLUSTRATED EMBODIMENTS

Figure 1A:
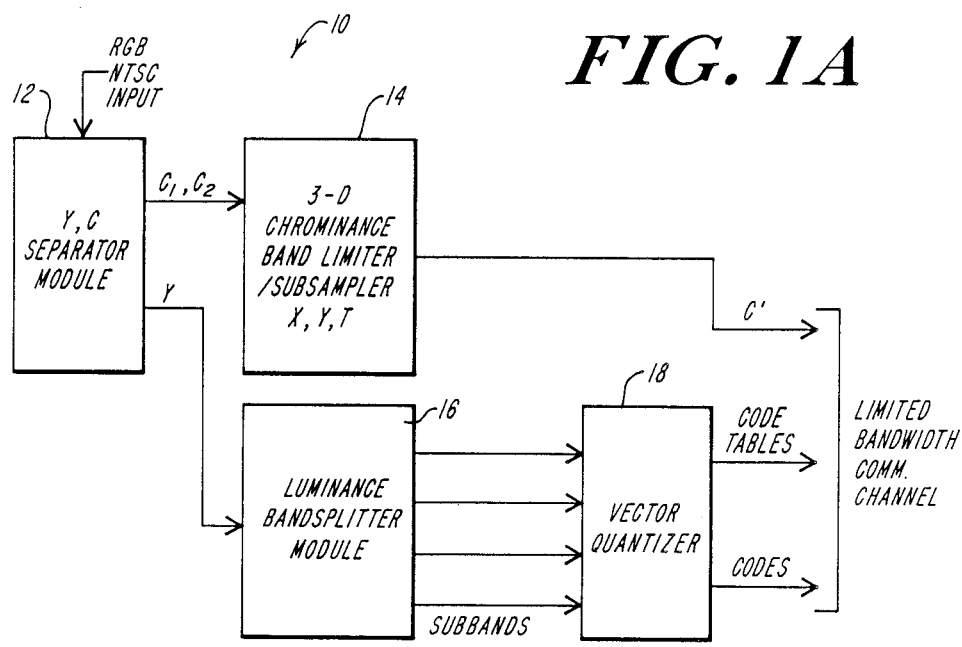
FIG. 1A is a block diagram depicting image coding and compression apparatus according to the invention.
Figure 1B:
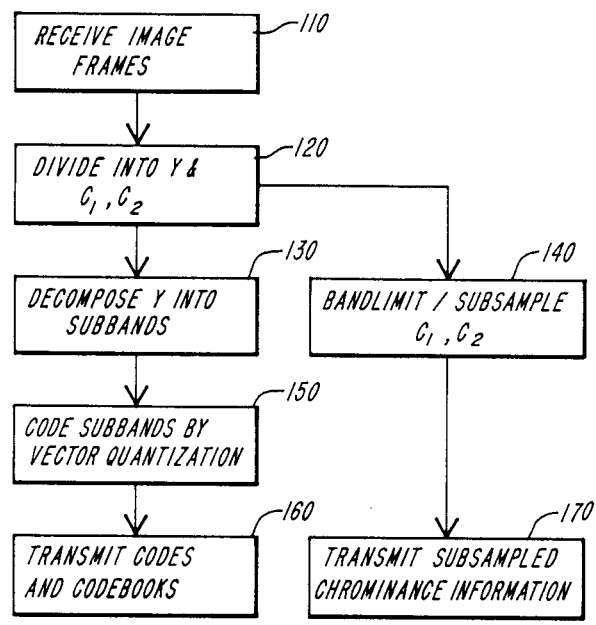
FIG. 1B is a flow diagram depicting a image coding and compression method according to the invention.

FIG. 1A depicts an image coding and compression apparatus 10 according to the invention, the operational steps of which are illustrated in the flow diagram of FIG. 1B.

The system 10 includes elements for encoding images for low bandwidth transmission or storage. System 10 is an asymmetriCal encoder, wherein greater processing is required for encoding than for decoding. Asymmetrical encoding is premised on the assumption is that a moving image sequence, such as a motion picture or "movie," can be encoded once and viewed many times. The asymmetrical encode/decode format offers the advantage of a relatively simple, inexpensive decoder implementation.

Additionally, as discussed in greater detail below, system 10 can be optimized for processing moving image sequences in which the entire sequence is available for encoding prior to transmission. Advance knowledge, referred to herein as "lookahead information," of what will transpire in the image sequence can thus be exploited to prepare for major changes in image content, by adjusting bandwidth allocation.

As indicated in FIGS. 1A and 1B, the encoding system 10 operates by dividing input images into luminance and chrominance components, and decomposing the luminance components into a set of subbands. The energy in each subband is dependent upon image content, and the sensitivity of the human visual system (HVS) to errors in each band is different. Thus, in accordance with the invention, the system 10 advantageously allocates coding and transmission bandwidth, in a manner described in greater detail hereinafter, in proportion to visual sensitivity and the energy in each band.

Referring to FIGS. 1A and 1B, input images are first processed in a conventional separator module 12 (step 120 of FIG. 1B) to separate color information (chrominance) from luminance information. In particular, the red (R), green (G), and blue (B) color image components of a color image are first processed in a known manner by executing a matrix transform in module 12 to yield a luminance component (Y) and two color components (C1 and C2). In broadcast television practice, these components are referred to as Y for luminance, and I and Q for the two color components. In a manner similar to that utilized in conventional broadcast television, greater bandwidth can be allocated to luminance information than to chrominance. A variety of known techniques can be utilized for implementing this initial luminance/chrominance decomposition.

The chrominance information is then bandlimited by bandlimiter 14, in a manner similar to that utilized in conventional television practice, but in three dimensions (X,Y,and T), rather than the single dimensional bandlimiting utilized in conventional television systems. The resulting bandlimited signals, by virtue of their decreased information content, can then be subsampled.

The bandlimiting and subsampling steps of the invention can be contrasted with that of conventional image communications practice. In conventional NTSC broadcasting systems, for example, chrominance information is bandlimited horizontally only and then modulated. Digital image communications systems typical of the prior art bandlimit and subsample chrominance information in two dimensions. In accordance with the invention, however, because moving images are being processed, the chrominance signal can be subsampled in a temporal dimension as well as two spatial dimensions, thus reducing the required frame rate by a factor of two.

In one embodiment of the invention, the separator or decomposition filtering module 12 utilizes simple replication of the color information on successive frame pairs. The chrominance information can be subsampled by a factor of 10 horizontally and vertically, and by a factor of 2 temporally, thus yielding a 200:1 reduction in the data rate required for the information which adds color to a given monochromatic image. These values are presented by way of example only, and other subsampling rates can be utilized in accordance with the invention. The illustrated spatial subsampling procedure may utilize a subsampling factor of eight, which would yield chrominance images having the same size as the smallest luminance image. The resulting smallest unencoded image could therefore be readily displayed as a "postage-stamp" sized version of the frame, enabling image browsing without performing any decoding processing. Alternatively, this smallest image can be further encoded to reduce the overall bandwidth requirement of the system.

In a preferred embodiment of the invention, the additional channel space gained by temporal chrominance bandwidth reduction can be utilized to transmit additional digital information in the NTSC channel which is invisible to the HVS when a conventional receiver is utilized, but which can be detected on a receiver designed to extract the additional digital information. This information can be employed to enhance the resolution of the conventional television signal, or can be utilized to contain digital audio, or any other digital information. The invention is therefore adapted for application to "extended definition" television systems (EDTV) in which a conventional receiver displays only a conventional broadcast, while an EDTV receiver detects such information "hidden" in the signal to create an enhanced image.

In particular, two successive image frames can contain the same color information, but the digital data can be added to frame one and subtracted from frame two so that its average value is zero. The effect of this scheme is that high temporal frequency (rapidly changing) noise is superimposed over the half rate chrominance information, and therefore invisible, while the chrominance can be updated at only one-half the conventional frame rate.

Referring again to FIGS. 1A and 1B, following separation of chrominance from luminance information (step 120 of FIG. 1B), the luminance information is further processed and encoded (steps 130 and 150 of FIG. 1B). In one practice of the invention, the luminance processing takes place in two stages: The images are first transformed into a set of component blocks (step 130 of FIG. 1B), herein referred to as subbands. Subsequently, each subband is coded (step 150 of FIG. 1B). While decomposition utilizing QMFs can be lossless—except for unintentional roundoff errors and imprecision in filter design—practical implementation of the coding step, as described more fully hereinafter, introduces errors which may arise in reconstruction of the image. However, in accordance with the invention, the luminance decomposition and subsequent encoding relegate any such errors to regions of the picture sequence that contain little energy, or regions wherein such errors are effectively masked by characteristics of the HVS.

The decomposition indicated in step 130 is based on frequency. Spatially, the high frequency components of the image contain the information necessary to render edges and fine detail sharply and clearly. Temporally, the high frequencies represent motion. By way of example, in an audio signal processing system, eliminating the high frequencies results in a muted sound. Analogously, in an image, eliminating the high spatial frequencies results in a softer, more blurred picture. Eliminating the high temporal frequencies blurs objects in motion.

Figure 2A:
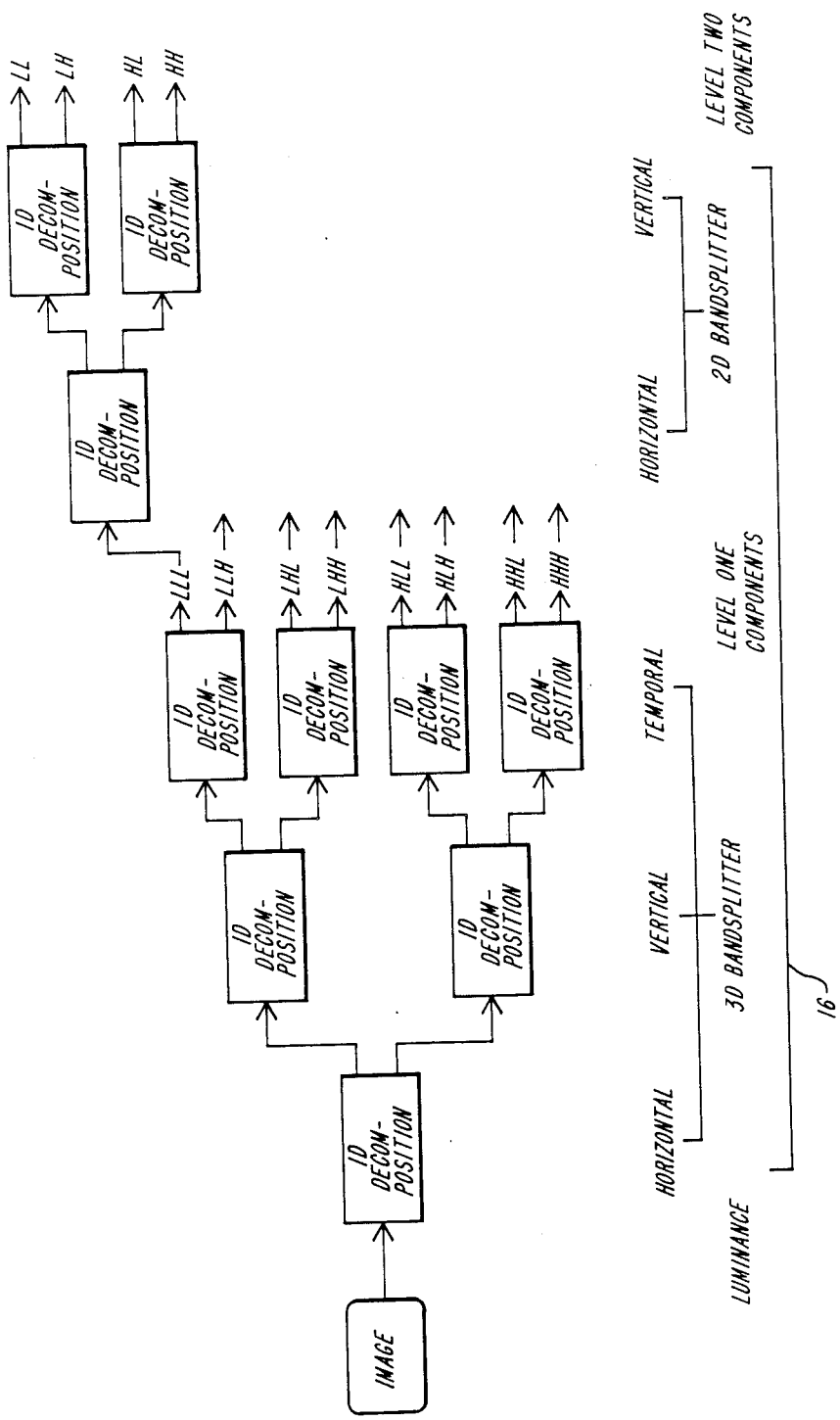
FIGS. 2A-2D depict aspects of subband decomposition in accordance with the invention.
Figure 2B:
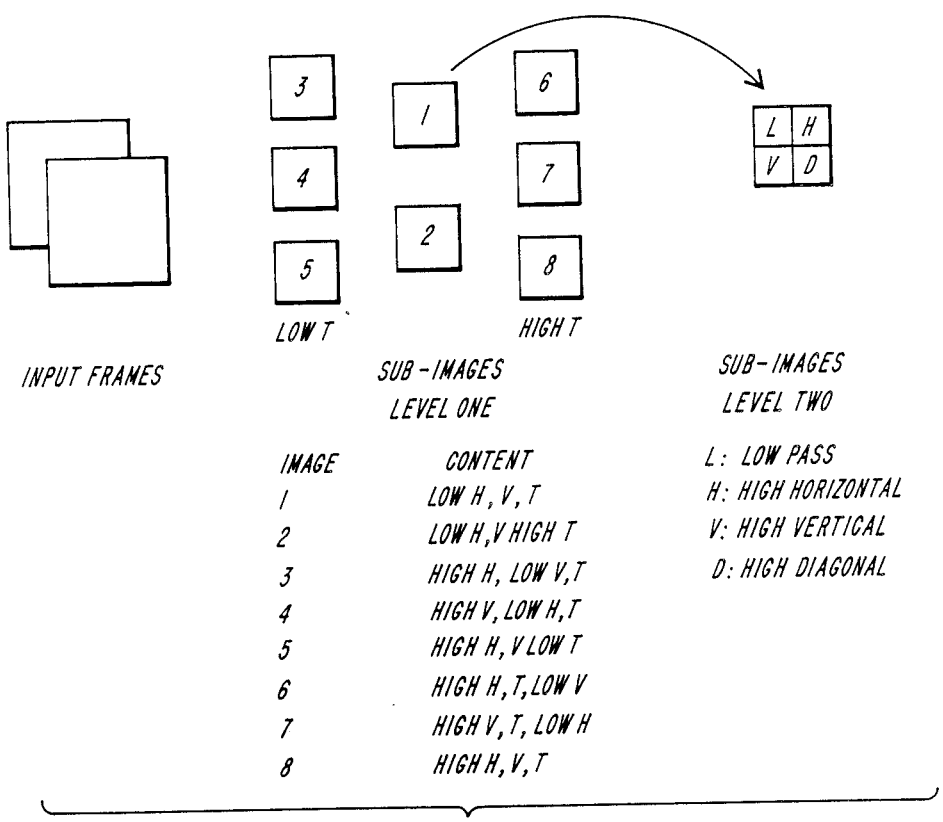
Figure 2C:
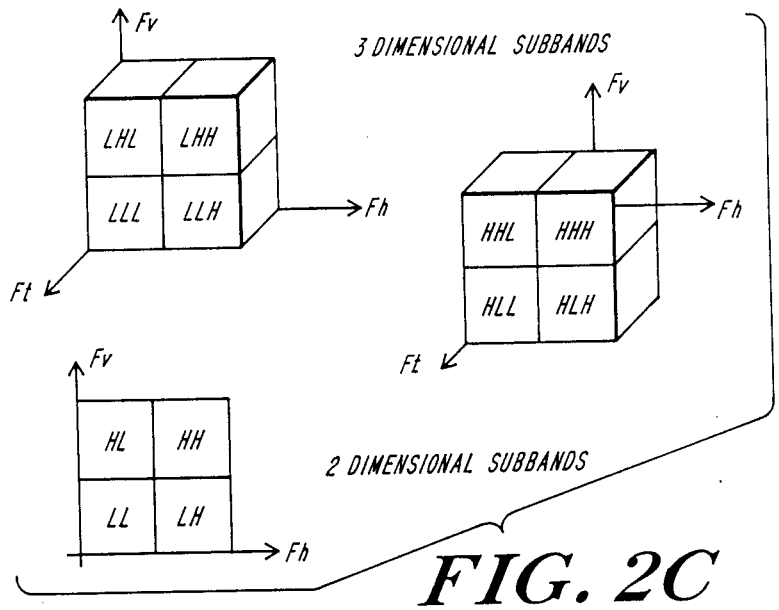
Figure 2D:
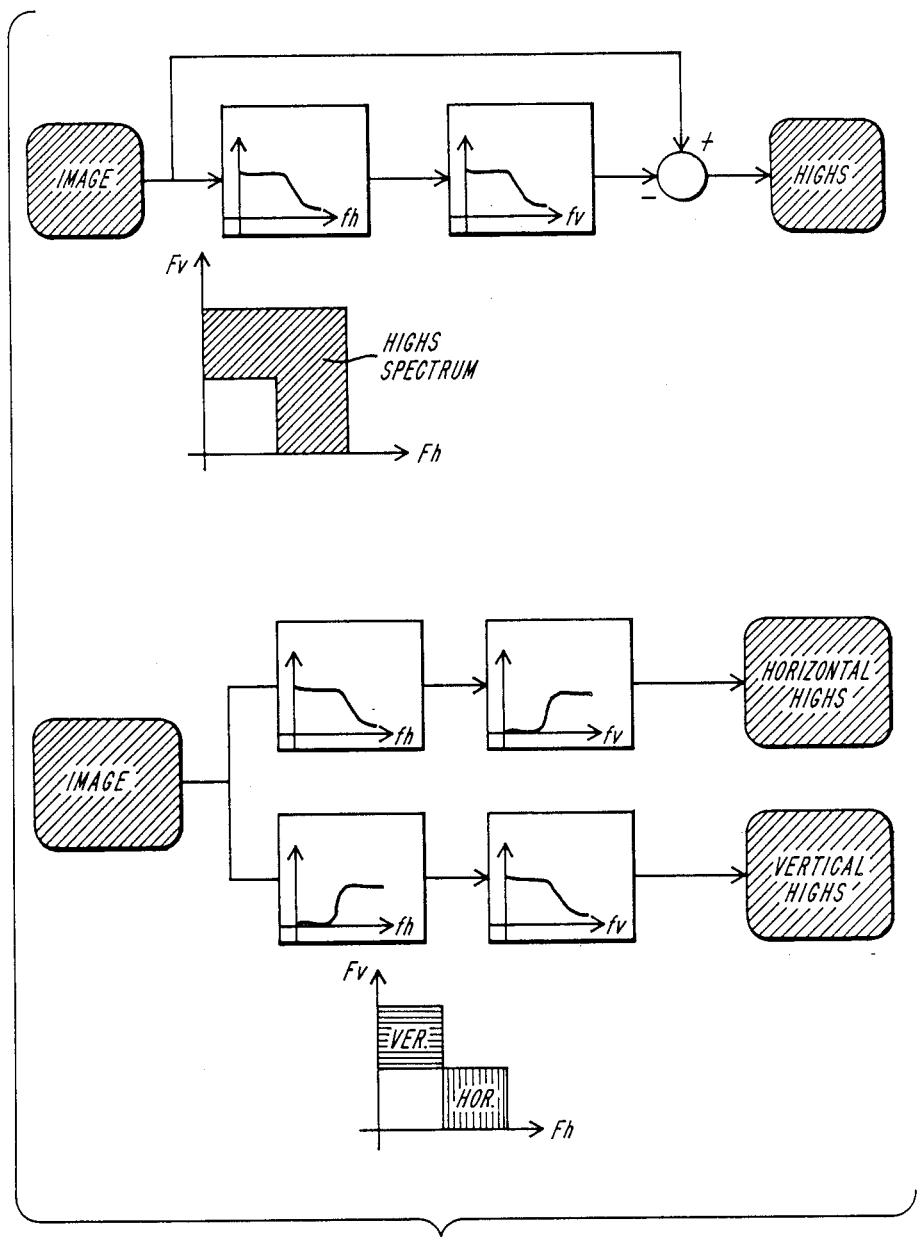

Referring now to FIGS. 2A and 2B, in subband decomposition according to the invention, two input frames are filtered to separate the high and low vertical, horizontal and temporal frequencies. As a result of this filtering, the information content in each resulting image is reduced, thereby allowing subsampling without loss of information. This process can be executed recursively—filtered images can be filtered again, and so on. This luminance decomposition can be implemented in one, two or three dimensions. Multidimensional subbands can be created by separably filtering in single dimensions. Two and three dimensional subbands are illustrated in FIG. 2C.

In one embodiment of the invention, illustrated in FIG. 2A, a three dimensional decomposition is followed by a two dimensional decomposition. In the first stage, the two input frames are divided into eight subbands by spatial and temporal filtering and subsampling. Subsequently, the low frequency sub-image is again filtered and subsampled spatially.

Each of the subbands, or "sub-images" which result from the level 1 decomposition have distinguishable content and significance to the image processing system. The sub-images, identified hereinafter by their horizontal-vertical-temporal labels, are as follows:

1. low-low-low: This image contains the low frequency horizontal, vertical and temporal information, subsampled by a factor of two. It is a blurred version of the original image both for objects and detail.

2. low-high-low: This image contains the static horizontal edge details. The information removed from the image in generating blurred image #1 remains in this image for horizontal images. There is little vertical detail or motion information.

3. high-low-low: This is the same as #2 for vertical edges.

4. high-high-low: This image contains the static diagonal information, that is, edges which are not moving—i.e., edges which are the same on frames one and two—and which are oriented obliquely in the frame.

5. low-low-high: This is the difference between a blurred first frame and a blurred second frame. It is the moving blurred information. If frames one and two are equal, this image contains nothing (a region of still frames, for example).

6. low-high-high: This is moving vertically oriented information. If a vertical edge has changed position between the frames, then the sharp detail of that edge will appear here.

7. high-low-high: Same as #6 for horizontal information.

8. high-high-high: Same as #6 for oblique edge information.

Those skilled in the art will recognize that the energy in each of these sub-images is dependent upon scene content. If there is no motion at all, then sub-images corresponding to high frequency temporal information will be blank—they will contain no information. Similarly, if there is no change of brightness across the picture, as would be the case in an image of alternating light and dark horizontal bands, then the high horizontal detail subimages and oblique sub-images would contain no information. Only the vertical detail sub-images would contain energy.

In generating these sub-images, the bandsplitting elements have not discarded any image content, other than through imprecision or filter design limitations. The sub-images can therefore be recombined to create a substantially perfect replica of the original. The rationale for creating the sub-images, however, is that the HVS is not equally sensitive to the information contained in each sub-image, and thus each can be coded differently by the next stage of the process, to optimize allocation of limited bandwidth resources.

In particular, the high diagonal detail images can be discarded entirely, with no significant perceived degradation of the picture. Also, more coding error can be tolerated in the high frequency sub-images than in the low frequency ones. Thus, image #1, above, must be coded relatively precisely as compared to the others, and images #4 and #8 can be coded least accurately. In one embodiment of the invention, images 4 and 8 can even be discarded without perceptible degradation of the image.

As illustrated in FIG. 2A, prior to coding, image #1 is further decomposed horizontally and vertically, yielding a very-low frequency image, and three intermediate frequency band images. These four sub-images can be used to reconstruct image #1, which can in turn be used with images 2–8 to reconstruct the original. Again, the decomposition introduces no intentional error, but is preferred for optimization of coding and bandwidth allocation. Because the sensitivity of the HVS is proportional to frequency, the very-low image is preferably not compressed (or reduced in bit rate) at all. It is preferably represented with 8 bit PCM codes with no additional bandwidth reduction. Those skilled in the art will appreciate that some bandwidth reduction could be applied to the very-low image. However, it is critical that this image contain very few errors—i.e., it must retain a high signal to error ratio. The intermediate images, in turn, are coded with a very small error introduced, and the highs are permitted to contain greater error.

In a preferred embodiment of the invention, the images are filtered with quadrature mirror filters, which permit substantially error-free reconstruction.

Because the complete set of sub-images that result from the decomposition is derived from two input frames, the set can be transmitted at only 15 frames per second. In particular, the image set is used to reconstruct a pair of frames, or two-thirtieths of a second of picture information.

Figure 3A:
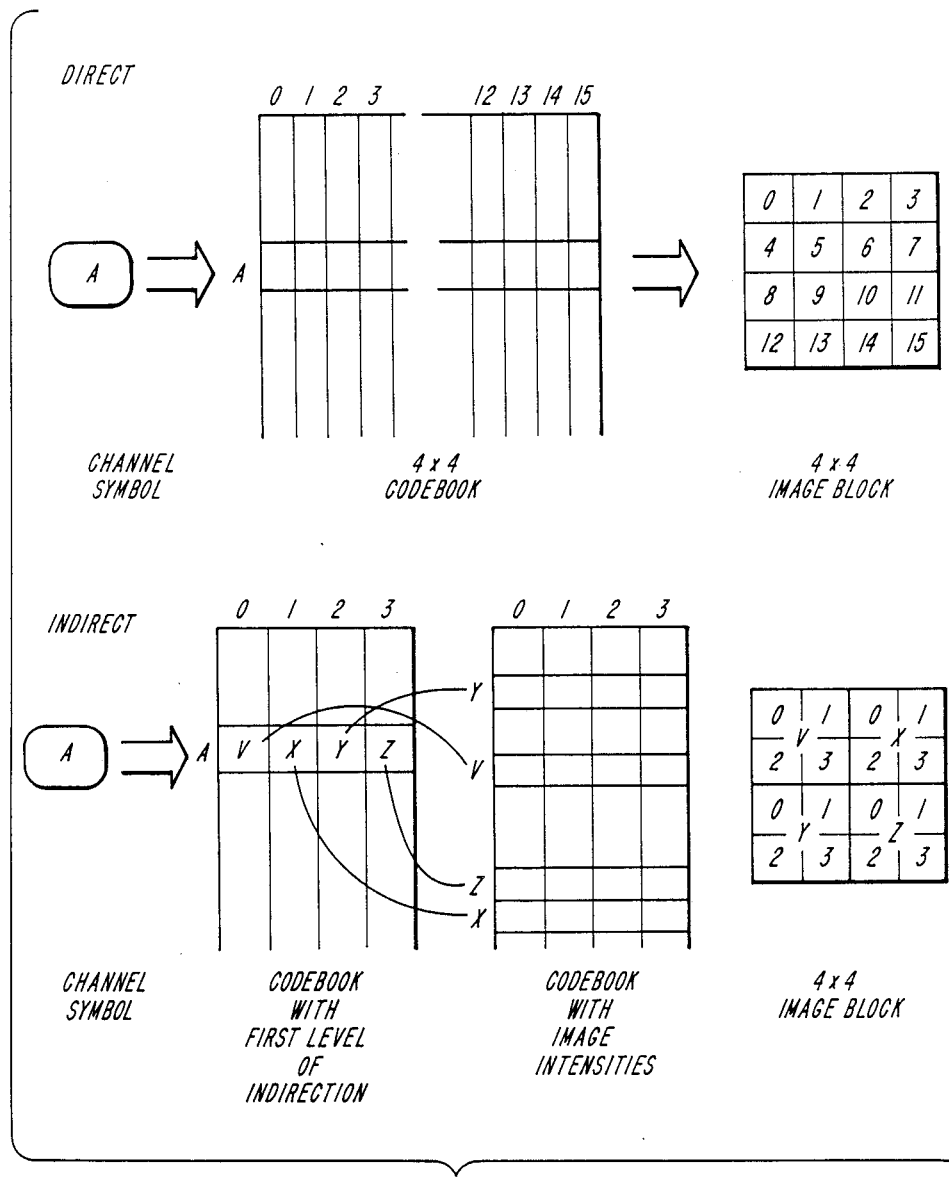
FIGS. 3A and 3B depict vector quantization codebook aspects in accordance with the invention.
Figure 3B:
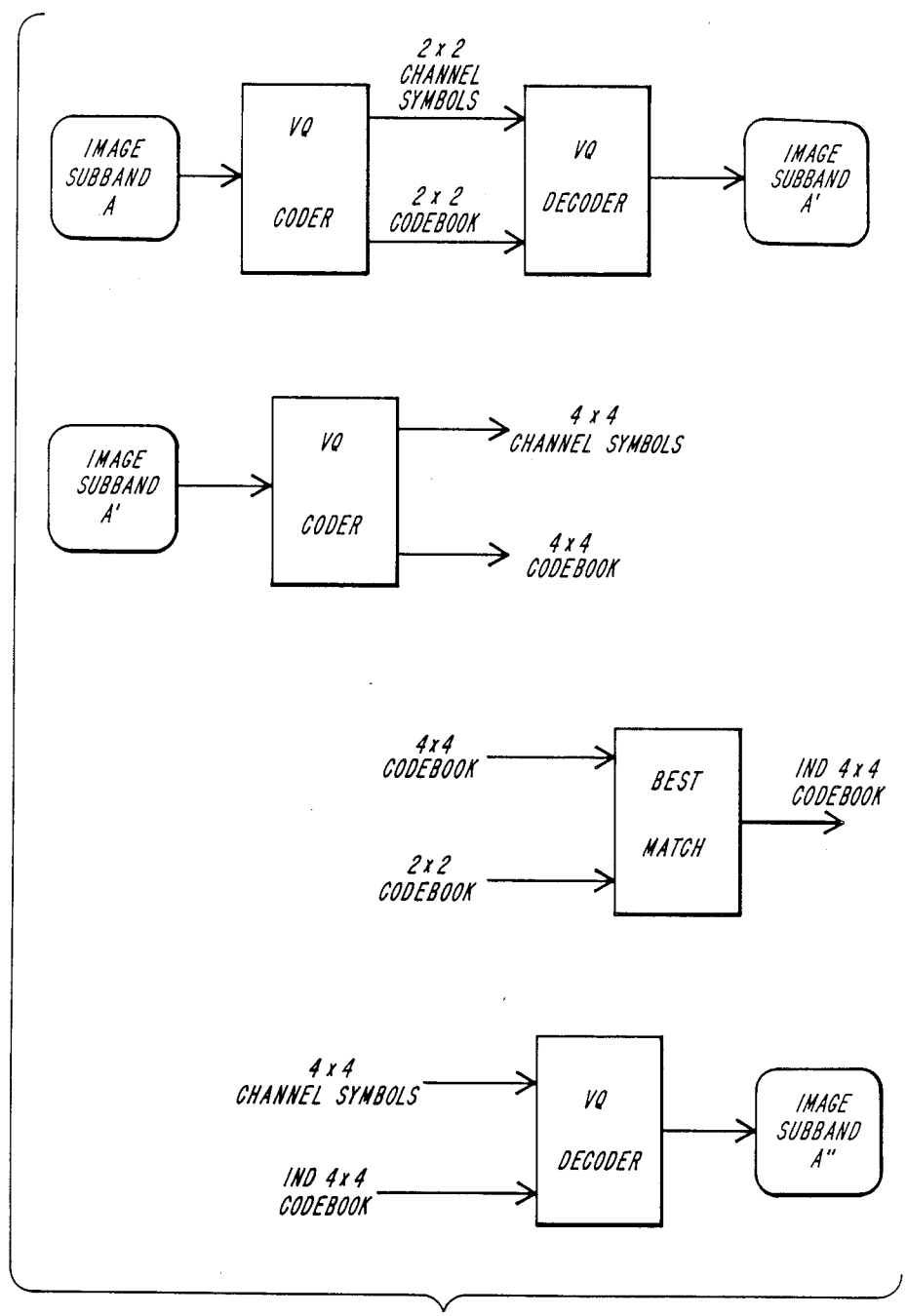
Figure 4:
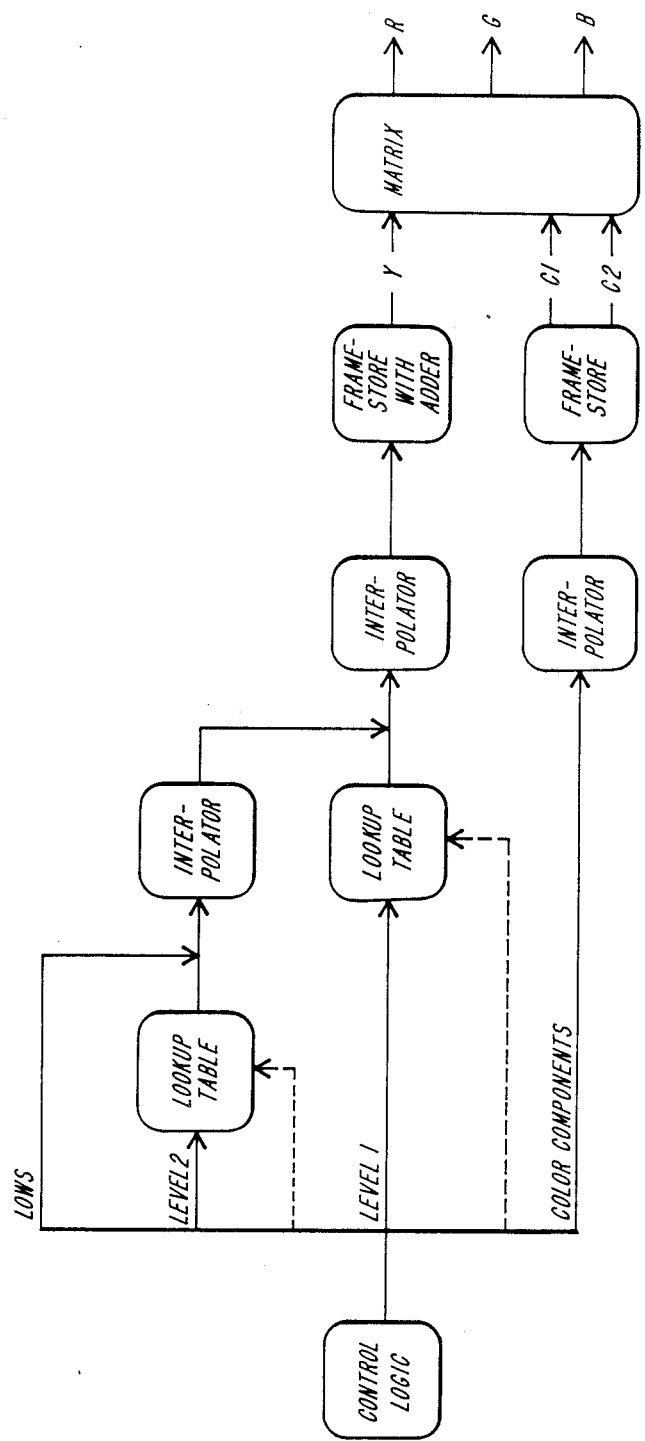
FIG. 4 is a block diagram depicting a decoding system utilized in connection with the apparatus of FIG. 1A.

Referring now to FIGS. 3A and 3B, the sub-images are then coded using a vector quantizer (module 18 of FIG. 1A). In this quantizer, a block of image elements in a particular sub-image is analyzed. A diCtionary of allowable blocks is created and the closest match between the actual block in the image and the available blocks in the dictionary is found, and the entire block is replaced by the dictionary address. On decoding, the addresses are "looked up" in the dictionary and the block found then replaces the address. A key issue in the design of this type of coder is the creation of a good dictionary that will closely re-create the picture: The larger the dictionary, the better, and a dictionary created from the picture itself will generally perform better than one created from a different picture. Since the dictionary must exist at the decoder before any decoding can be done, the cost of transmitting the dictionary must be taken into account. The goal is to create a dictionary which will be usable for many frames, and occasionally portions of it are updated to replace those portions that ar out of date.

In a preferred embodiment of the invention, codebook optimization is implemented in that the characteristics of the horizontal and vertical sub-images are similar when rotated 90 degrees, thus allowing the same dictionary or codebook to be used for each. In other words, the horizontal edge detail appears much like vertical detail "on its side". This is referred to herein as "orientation independent codebooks."

Also, since the sensitivity of the HVS depends on the spatial frequencies involved, different amounts of encoding error can be permitted to result from processing difference component sub-images. In particular, humans are less sensitive to noise in the high frequency regions of the picture (edges). To exploit this, the system permits least error in the low frequency sub-images and successively greater error in the mid- band and high frequency components. This is implemented by generating the codebook from the mid-frequency images and then using this codebook as a basis for forming the codebook used in the higher frequencies.

An example of this technique is shown in FIG. 3A. The mid-range images are coded using a 2×2 block that is derived directly from the image itself. The high frequencies are coded using a 4×4 block that is composed of groups of 4 2×2 blocks from the mid-range image. Thus, instead of requiring 16 numbers in the dictionary for the high frequency elements, the invention requires only 4, where each number is in turn the dictionary address of the 2×2 block that can be found in the mid-band dictionary. This technique reduces the dictionary for the high frequencies by a factor of 4, at the cost of slightly increased error. This increased error is the result of the fact that the 2×2 blocks that make up the code-table are not as accurate as choosing 16 independent values.

This codebook optimization scheme is referred to herein as indirect codebook addressing or multi-scale codebook generation, and is further illustrated in FIG. 3B. This enhancement is based on statistical image correlations: The features in the image are similar in each subband, so that the codebooks can also be similar. As a result of these statistical correlations, the error introduced by indirect codebook addressing is small.

An important feature of this system is the fact that the images are processed as a group—for example, a complete movie image sequence—rather than one at a time. This permits "look-ahead" in the sequence and preparation for drastic changes in the picture sequence. In conventional realtime encoders that cannot "look-ahead," when there is a scene change or major change in content, such as an explosion or very rapid motion, the coder tends to lag behind the image changes. This is generally true if the coder exploits similarity between adjacent frames. If adjacent frames are dissimilar, then additional information is required, and the channel can be overloaded, preventing transmission of sufficient information. This lag can be acceptable since there is a delay in the human visual system for sensitivity to detail. When a human views a new scene, up to one-half a second can elapse before the HVS clearly perceives fine detail in the scene change.

However, another characteristic of the visual system, which cannot be exploited without the look-ahead feature of the invention, is that this same HVS phenomenon is true for the few frames before an edit or scene change. The HVS will not perceive certain distortions of the last few frames, because perception of them is overwhelmed by the new scene about to begin.

The invention exploits this by using the frames before and after an edit or gross change in content to send the data for a new dictionary for the upcoming scene. This update is effected by eliminating the high frequency sub-images and sending dictionary information instead. In particular, in one embodiment of the invention, an entire movie (or at least several sequences from it) can be analyzed before coding can begin. This enables "look-ahead", or multiple passes through the input material to derive the image representation. Because a complete movie can be available before encoding, the system operator can manually or automatically determined locations in the movie where dictionary entries or other information can be substituted for image content. For example, short, rapid edits may lack detail in contrast to long, slow-moving scenes that are more accurately perceived.

Image Decomposition

Two luminance frames of an image sequence are divided by band-splitting filters—for example, 9 tap finite impulse response QMFs may be used spatially, with a simple [1 1] and [1 −1] temporal filter—into a set of eight sub-images. These images are then subsampled by a factor of two in two spatial dimensions. The result of this subdivision is the replacement of a pair of input frames with eight smaller images. Of these, the two containing the highest frequency diagonal detail are discarded; the remaining six are processed further. This is analogous to a rotated sampling pattern and results in a passband more closely approximating that of the human observer.

The image containing the low spatial and temporal components is further filtered into high and low-pass bands and subsampled, resulting in four additional smaller images for encoding. This subdivision by octaves results in sub-images where there is approximately equal energy in each band. The low-pass image from this set is transmitted either directly, in color, or the three color components are separately vector quantized in color alone to yield a single, eight bit per point representation with a color look-up table for each frame. The lowest frequency components need not utilize a spatial block.

Vector Ouantization

Eight images remain for quantization. These are the four sub-images carrying the static and moving detail images horizontal and vertical from the first level of the decomposition, and three images carrying the (static) horizontal, vertical and diagonal detail from the second level of the decomposition. In addition, the low spatial frequency, high temporal frequency image from the first level of the pyramid is encoded.

If somewhat isotropic content is assumed in the original scene, there will be similar horizontal and vertical components in the decomposition. To exploit this in the coder, the horizontal high-pass sub-images are rotated 90 degrees and encoded using the same code table as the vertical images. The remaining images are encoded each with their own tables.

The second level images are used as the training data for the quantizer. This is done so that they are more accurately represented in the code tables, since they carry mid-range image content information. By doing this, it is assumed that the visibility of noise and encoding artifacts in the mid-frequency ranges is higher than in the high frequencies and allocating quantization error accordingly. The lowest frequency components need not utilize a spatial block quantizer at all. They are encoded using 2×2 blocks within an image. Sub-images from the first level are encoded using a 4×4 block Comprised of 2×2 blocks generated by the training set. This optimization conserves table bandwidth and is consistent with the error distribution approach noted above.

Table Transmission

A code table for each scene is created and transmitted during the frames abutting either edits in the movie or regions of extremely fast action. During the transmission period occupied by table updates, the high-pass sub-images from the first level of the decomposition are not transmitted. Temporal masking of detail by the scene change minimizes the impairment introduced by omitting these images.

In one embodiment, a separate code table for each different scene is composed and it is either transmitted explicitly or recalled from a "dictionary" of such tables maintained at the decoder. Alternatively, a single, large table for the entire movie can be made and subdivided into successively smaller blocks that can then be recalled by address from local storage in the decoder.

Motion Compensation

Those skilled in the art will appreciate that the invention can be practiced in an embodiment utilizing motion compensation techniques. In accordance with this embodiment of the invention, instead of transmitting the low-low-low image data for each frame—for example, at the rate of 12/sec—, the coding system can transmit the low-low-low signal at a reduced rate, and transmit a signal representative of the differences between successive frames. The system thus transmits a motion field and an error frame which compensates for motion, in accordance with known image processing algorithms. In a particular embodiment of the invention, the subband containing the spatial lowpass, temporal highpass information—the low-low-high—is replaced by a prediction error signal in which the prediction is computed by motion compensated interpolation between successive low-low-low images.

Vector Quantization of Color

Figure 1C:
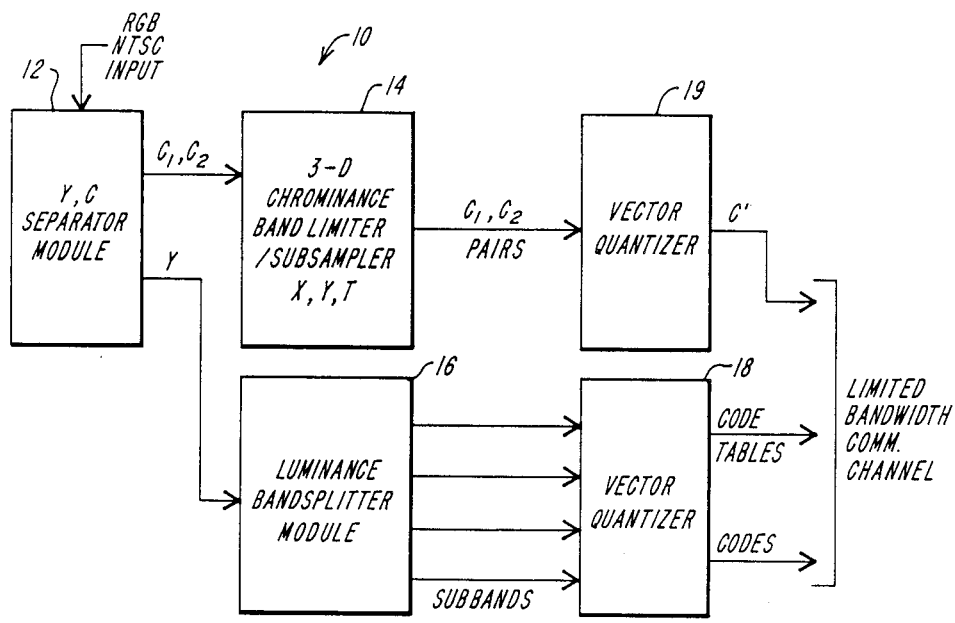
FIG. 1C is a block diagram depicting an embodiment of the invention utilizing vector quantization of color information.
Figure 1D:
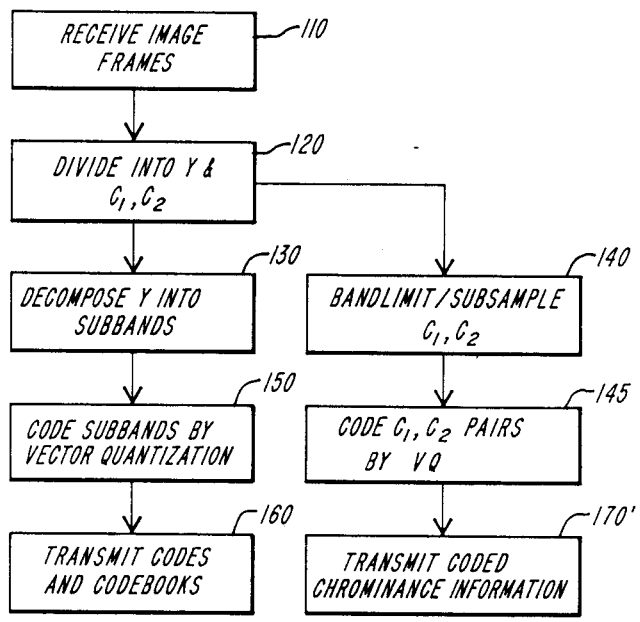
FIG. 1D is a flow diagram depicting a coding method executed by the embodiment of FIG. 1C.

A further preferred practice of the invention, depicted in the block diagram of FIG. 1C and the flowchart of FIG. 1D, provides coding of chrominance information by vector quantization. In particular, the invention can include a chrominance vector quantizer 19 which provides vector quantization coding of chrominance information by encoding C1, C2 data pairs (step 145 of FIG. 1D) to yield a single set of chrominance-representative values. Chrominance vector quantizer 19 can be constructed in a manner similar to that of luminance vector quantizer 18. Those skilled in the art will appreciate that a variety of vector quantization techniques can be utilized in connection with chrominance vector quantizer 19, including a two-dimensional vector quantization coding technique in which two-dimensional separable QMFs divide the image spectrum into equal-rate subbands.

It will thus be seen that the invention efficiently attains the objects set forth above, among those made apparent from the preceding description. In particular, the invention provides methods and apparatus for encoding and decoding images for selective storage, or for transmission and retrieval over a bandwidth limited channel, with maximum data compaction and minimum perceptible error.

It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

Having described the invention, what is claimed as new and secured by Letters Patent is:

1. A method of encoding an image, the image including a plurality of frames defined by a set of chrominance and luminance values, the method comprising the steps of
   recursively decomposing, to at least two levels of recursion, the luminance values of sequential frames into spatio-temporal spectral components, said spatio-temporal spectral components including a plurality of spatial components and a plurality of temporal components,
   said decomposing step including the steps of
   quadrature mirror filtering signals representative of said luminance values and
   subsampling said filtered signals, and
   coding each recursively decomposed level of at least one of said spectral components by vector quantization.

2. The method of claim 1 wherein the step of decomposing the luminance into spectral components further comprises separating the luminance values into high and low horizontal frequency subbands.

3. The method of claim 1 wherein the step of decomposing the luminance into spectral components further comprises separating the luminance values into high and low vertical frequency subbands.

4. The method of claim 1 wherein the step of decomposing the luminance into spectral components further comprises separating the luminance values into high and low temporal frequency subbands.

5. The method of claim 1 comprising the further step of discarding at least one spectral component corresponding to diagonal image features.

6. The method of claim 1 wherein selected spectral components are transmitted without vector quantization to reduce bandwidth requirements.

7. The method of claim 1 wherein said decomposing step is executed on frame sets having at least two frames.

8. The method of claim 1 comprising the further steps of
   decomposing the chrominance values of sequential frames into at least two chrominance spectral components, and
   coding said at least two chrominance spectral components by vector quantization.

9. The method of claim 1 wherein the step of decomposing the luminance into spectral components further comprises separating the luminance values into high and low subbands for horizontal, vertical and temporal information.

10. The method of claim 9 wherein the method further comprises decomposing the subband containing low frequency horizontal, vertical and temporal information into finer high and low subbands of horizontal and vertical information.

11. The method of claim 5 comprising the further step of replacing the subband containing low frequency horizontal, low frequency vertical, and high frequency temporal information with a prediction error signal, said replacing step including the step of computing said prediction error signal by motion compensated interpolation between successive values of the subband corresponding to low horizontal, vertical and temporal information.

12. The method of claim 1 wherein said coding step includes the step of recursively constructing code tables for a given level from code tables utilized for preceding levels.

13. The method of claim 12 wherein said step of recursively constructing code tables includes the step of utilizing a different block size at each level.

14. The method of claim 12 wherein the step of constructing code tables includes the step of constructing orientation-independent code tables.

15. The method of claim 12 wherein the step of constructing code tables includes the step of controlling code table size by establishing address pointers to indirectly address code tables.

16. The method of claim 12 comprising the further step of entropy coding said code tables to reduce bandwidth requirements.

17. The method of claim 12 comprising the further step of transmitting code table update information during scene boundary periods.

18. The method of claim 17 wherein the step of transmitting code table update information includes the step of lookahead processing to determine any of scene boundaries or image sequence locations where bandwidth can be allocated to table update information.

19. Apparatus for encoding an image, the image including a plurality of frames defined by a set of chrominance and luminance values, the apparatus comprising
    decomposing means for recursively decomposing, to at least two levels of recursion, the luminance values of sequential frames into spatio-temporal spectral components, said spatio-temporal spectral components including a plurality of spatial components and a plurality of temporal components,
    said decomposing means including
    quadrature mirror filter means for filtering signals representative of said luminance values and
    subsampling means for subsampling said filtered signals, and
    vector quantization means for coding each recursively decomposed level of at least one of said spectral components by vector quantization.

20. Apparatus according to claim 19 wherein the decomposing means includes means for separating the luminance values into high and low horizontal frequency subbands.

* * * * *